United States Patent [19]

Gates

[11] Patent Number: 4,969,083
[45] Date of Patent: Nov. 6, 1990

[54] NETWORK PROGRAMMABLE LOGIC CONTROLLER SYSTEM

[75] Inventor: Dirk I. Gates, Woodland Hills, Calif.

[73] Assignee: Petron Controls Corporation, Chatsworth, Calif.

[21] Appl. No.: 176,831

[22] Filed: Apr. 4, 1988

[51] Int. Cl.$^5$ .............................................. G01F 13/10
[52] U.S. Cl. .................................... 364/147; 364/136; 364/280.4; 364/923.71; 364/228; 364/200; 364/900
[58] Field of Search ........ 364/147, 136, 200 MS File, 364/900 MS File

[56] References Cited

U.S. PATENT DOCUMENTS

| | | | |
|---|---|---|---|
| 3,942,158 | 3/1976 | Dummermuth | 364/900 |
| 4,058,711 | 11/1977 | Ondercin et al. | 364/147 |
| 4,165,534 | 8/1979 | Dummermuth | 364/900 |
| 4,215,397 | 7/1980 | Hom | 364/136 |
| 4,413,319 | 11/1983 | Schultz et al. | 364/900 |
| 4,716,541 | 12/1987 | Quatse | 364/900 |

Primary Examiner—Jerry Smith
Assistant Examiner—Paul Gordon

Attorney, Agent, or Firm—Blakely, Sokoloff, Taylor & Zafman

[57] ABSTRACT

A programmable logic controller system having the capability of controlling up to 64 clusters of peripheral controllers, wherein each cluster has up to seven racks of peripheral controllers, each rack having up to 16 individual peripheral controllers. Excepting for the cluster containing the programmable logic controller, each cluster is coupled to the programmable logic controller through an ethernet cable to a cluster controller. Each of the seven racks of peripheral controller cards is connected to its respective programmable logic controller or cluster controller directly (for the first rack) or through a local rack adaptor (for the other six racks). The programmable logic controller generates data, address and control signals which are used by the peripheral controllers to operate machines and equipment on an assembly line. The data, address and control signals are generated by a ladder diagram created and modified in a separate personal computer, which may be coupled to the programmable logic controller through an ethernet cable. The code representing the ladder diagram created in the personal computer is downloaded through the ethernet cable to the programmable logic controller.

5 Claims, 4 Drawing Sheets

NETWORK PROGRAMMABLE LOGIC CONTROLLER SYSTEM

BACKGROUND OF THE INVENTION

1. Field of the Invention

The invention relates to the field of programmable logic controllers which are used to control machinery and equipment for automated and partially automated assembly lines. The controllers are programmed by the use of ladder diagrams wherein elements of a ladder diagram represent relays, switches and the like associated with the equipment and machinery on the assembly line.

2. Prior Art

Prior art programmable logic controllers can be directly coupled to up to 16 peripheral controllers which serve to interface the assembly line machinery and equipment to the programmable logic controller. Additionally, prior art programmable logic controllers can indirectly control six additional racks of sixteen peripheral controllers by using local rack adapters, there being one local rack adapter for each rack of sixteen peripheral controllers, for a total of 896 inputs and 896 outputs (assuming 8 inputs and 8 outputs per peripheral controller). Ladder diagrams which are, in effect, the program used by the programmable logic controller to generate the appropriate control, data and address signals for the peripheral controllers, are created and edited using a separate processor such as a personal computer or minicomputer. The completed ladder diagram is recorded on magnetic tape or disk which is removed from the processor which created the ladder diagram, and read into the memory of the programmable logic controller through a disk or tape drive connected to the programmable logic controller. A representative prior art programmable logic controller is a Model 700 Controller manufactured by Square D Company.

Prior art ladder editors are typically part of the programming panel of the prior art programmable controllers.

SUMMARY OF THE INVENTION

The present invention is directed to a programmable logic controller system having the capability of controlling up to 64 clusters of peripheral controllers, wherein each cluster has up to seven racks of peripheral controllers, each rack having up to 16 individual peripheral controllers. Excepting for the cluster containing the programmable logic controller, each cluster is coupled to the programmable logic controller through an ethernet cable to a cluster controller. Each of the seven racks of peripheral controller cards is connected to its respective programmable logic controller or cluster controller directly (for the first rack) or through a local rack adaptor (for the other six racks). The programmable logic controller generates data, address and control signals which are used by the peripheral controllers to operate machines and equipment on an assembly line. The data, address and control signals are generated by a ladder diagram created and modified in a separate personal computer, which may be coupled to the programmable logic controller through an ethernet cable. The code representing the ladder diagram created in the personal computer is downloaded through the ethernet cable to the programmable logic controller. The ladder diagram is created and edited using a ladder editor program having the following features: scrolling, zoom in/out, free format line drawing, real time incremented compiler/linker, dynamic reconfiguration.

Assuming an eight bit data path, each peripheral controller controls up to eight points such as an on/off switch. Since each controller has an input channel and an output channel, there are, in effect, 16 control lines available per controller, although only 8 are available at a time for input or output Thus, within a group of 16 peripheral controllers, up to 256 points may be controlled (128 input points and 128 output points). Within a cluster of 7 racks of 16 peripheral controllers, up to 1792 points can be controlled with a single programmable logic controller (and 6 local rack adaptors). Similarly, when the full complement of 64 clusters is installed, up to 114,688 points can be controlled by the single programmable logic controller, 63 cluster controllers and 384 local rack adaptors (i.e., six local rack adaptors per cluster).

Additionally, using a personal computer coupled to the programmable logic controller through an ethernet cable, the ladder diagram used in the system can be easily and dynamically modified as required.

DETAILED DESCRIPTION OF THE INVENTION

Figure 1:
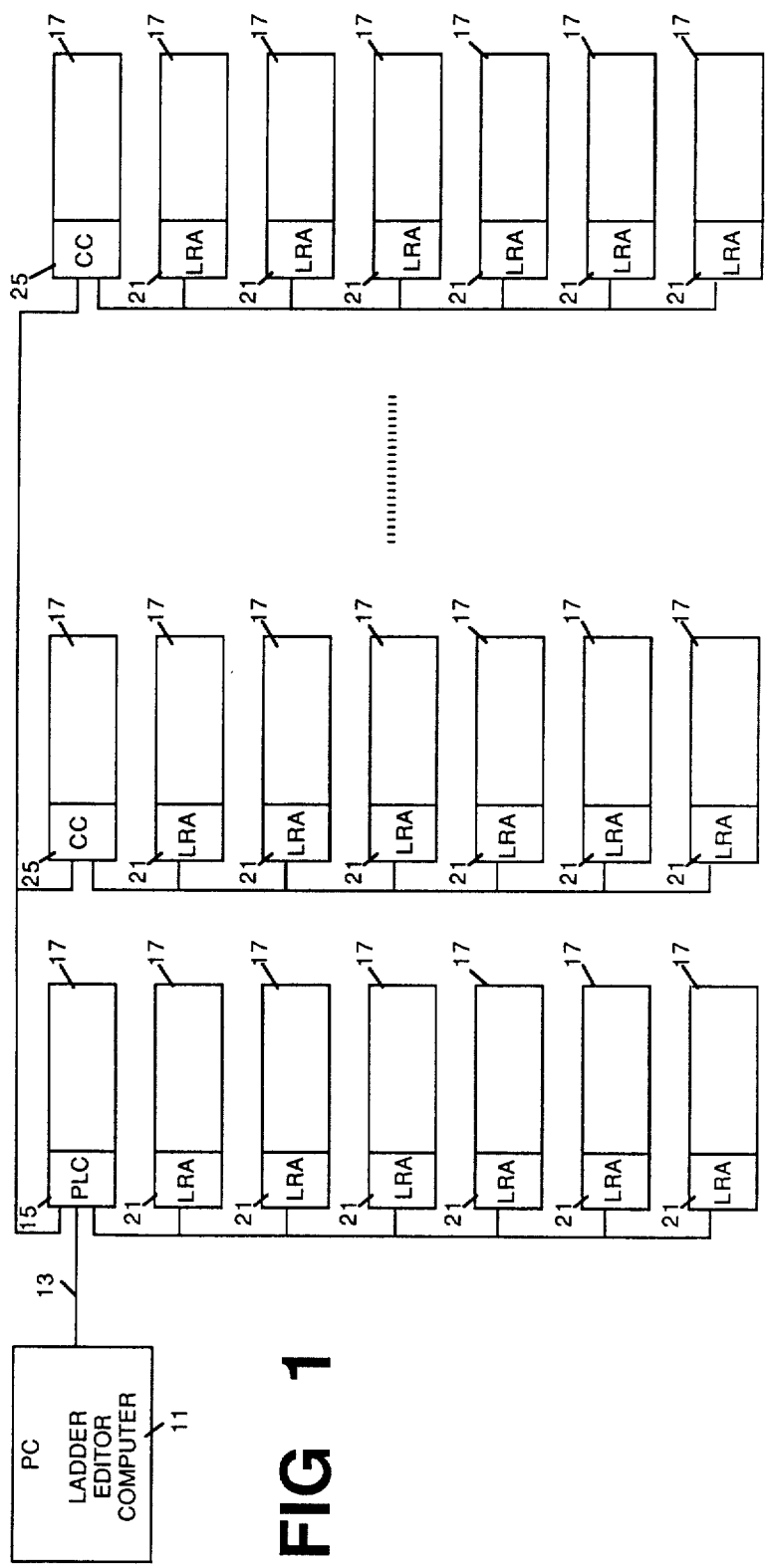
FIG. 1 is an overview diagram of the invented programmable logic controller system showing the use of a single programmable logic controller to control up to 64 clusters, each containing seven racks of peripheral controllers.

Referring first to FIG. 1, the components of the invented programmable logic controller system are shown as personal computer (PC) 11 which is coupled through an ethernet cable 13 to programmable logic controller (PLC) 15. PLC 15 controls up to sixteen peripheral controllers 17 directly and, indirectly, six additional local racks, each having up to sixteen peripheral controllers, through local rack adaptors 21. PLC 15 is also shown coupled through an ethernet cable to up to 63 cluster controllers 25. In this manner, PLC 15 and each cluster controller 25, directly control up to sixteen peripheral controllers 17, and indirectly control up to sixteen peripheral controllers in each of six racks through six local rack adapters 21. Within a cluster, each local rack adapter is coupled to its adjacent local rack adapter, cluster controller or PLC by a 50 conductor cable.

Figure 2:
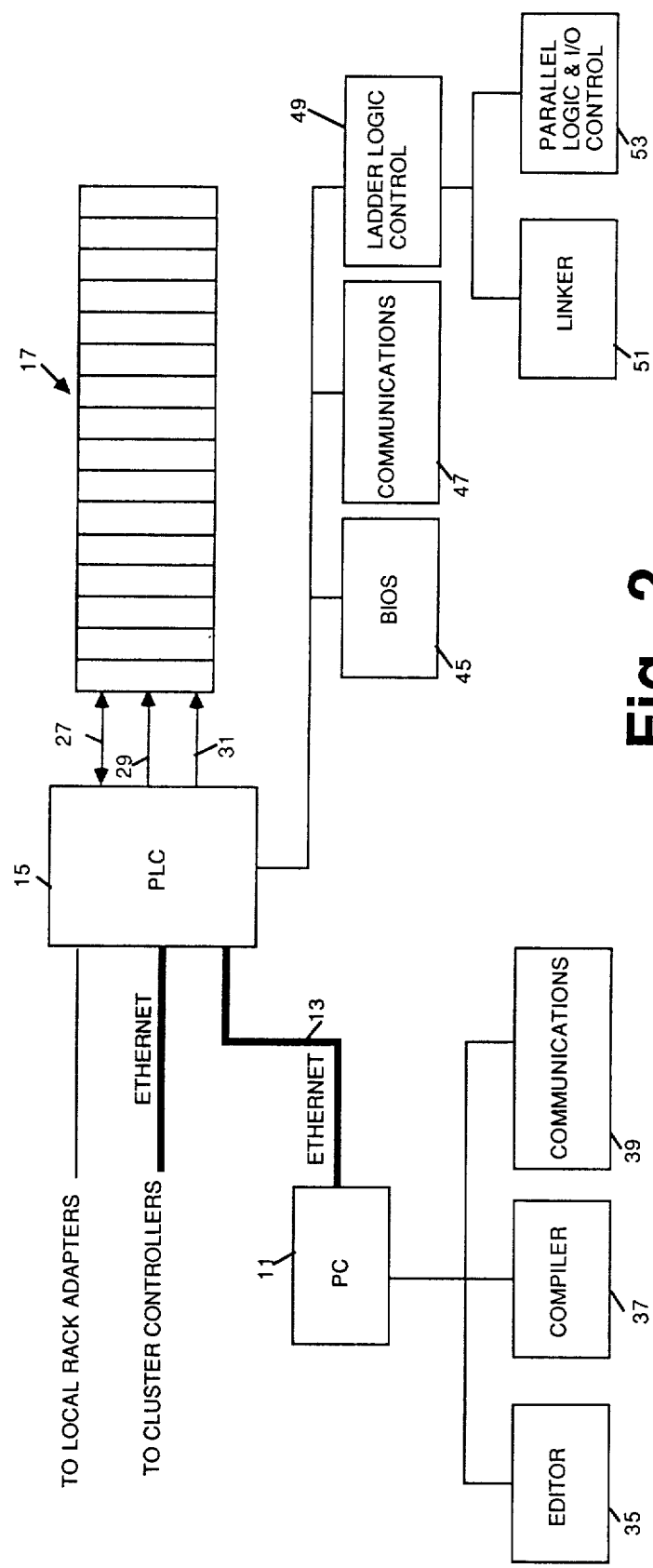
FIG. 2 is an overview block diagram showing the various functional elements coupled to a programmable logic controller for use in the present invention.

FIG. 2 illustrates in further detail the relationships between the major components of the invented programmable logic controller system. Specifically, PLC 15 is coupled to peripheral controller 17 through an 8 bit data bus 27, a six line control bus 29 and an 8 bit address bus 31.

PLC 15 is coupled to PC 11 through an ethernet cable 13. Personal computer 11 may be any commercially available personal computer, but in the preferred embodiment, is an IBM PC/XT, IBM PC/AT or compatible. PC 11 performs three tasks which are shown in FIG. 2 as the compiler task 35, the editor task 37 and the communications task 39. The compiler task should have the capability of generating executable object code from ladder diagram source code on a line by line basis. A suitable compiler task which may be used in the present invention is disclosed in U.S. Pat. No. 4,722,071 which issued Jan. 26, 1988. Editor task 37 and communications task 39 will be described in detail below.

Figure 4:
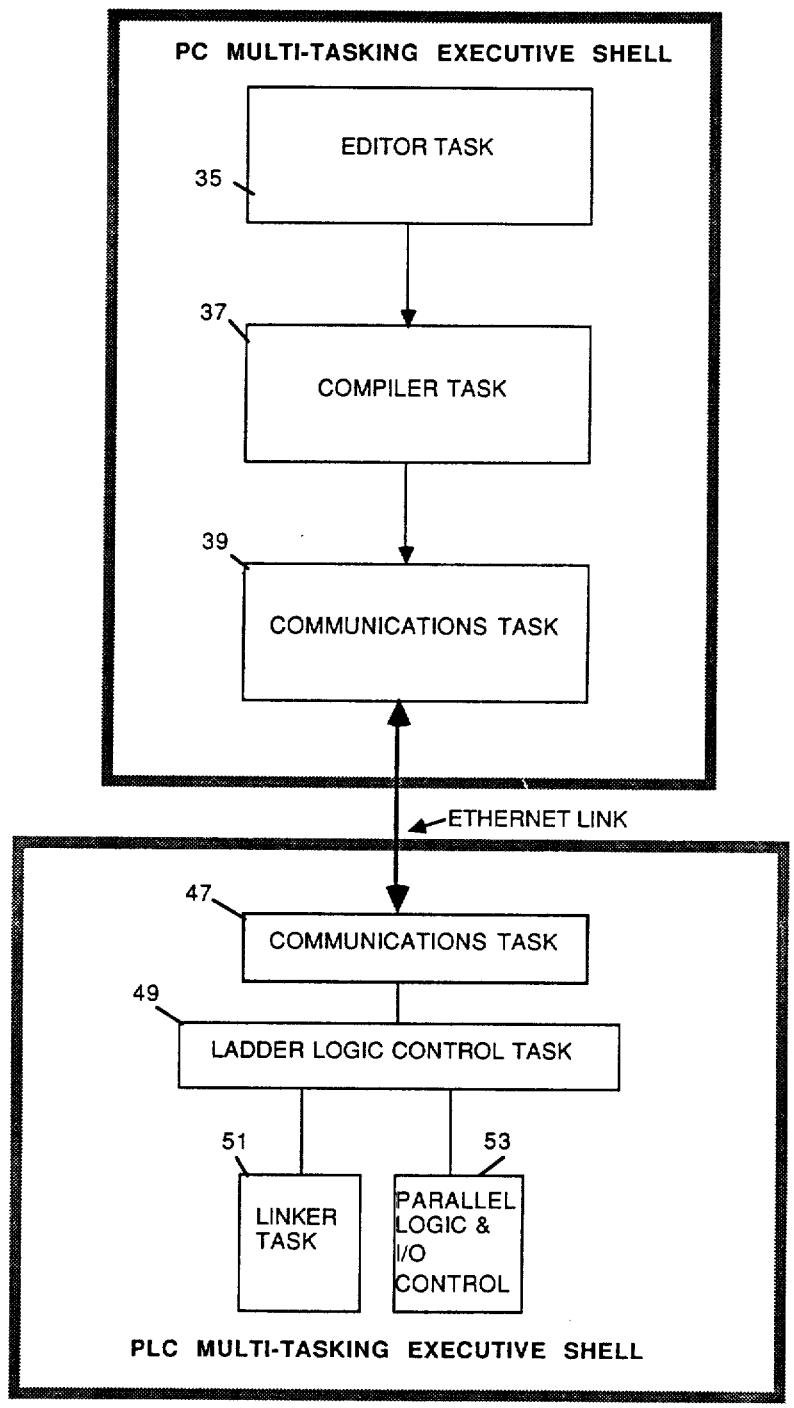
FIG. 4 is an overview block diagram illustrating the relationship of various software tasks necessary to implement the invented programmable logic controller system.

PLC 15 in the present invention performs the three tasks which are shown in FIG. 2 as the basic input output system (BIOS) task 45, communications task 47 and ladder logic control task 49. Ladder logic control task 49 includes linker sub task 51 and parallel logic and I/O control sub task 53. Details of each of the foregoing tasks and sub tasks will be described below. The logical relationships between the foregoing tasks and subtasks is shown in FIG. 4, which shows the PC 11 tasks under control of a PC multitasking executive shell and the PLC 15 tasks and subtasks under control of a PLC multitasking executive shell.

Figure 3:
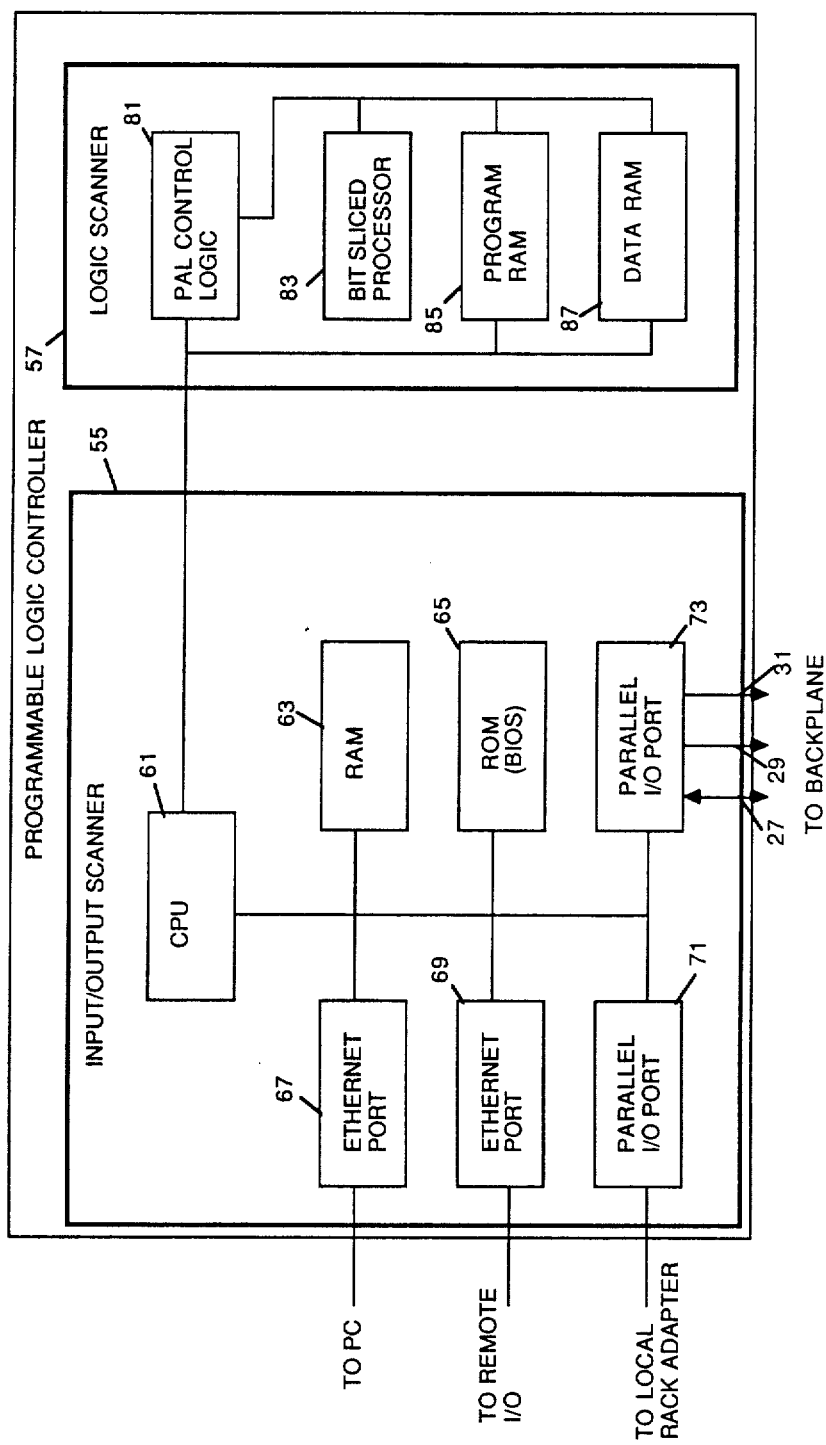
FIG. 3 is a block diagram showing the components of a programmable logic controller for use in the invented system.

The components necessary to implement PLC 15 in the present invention are shown in block diagram form in FIG. 3 and comprise input/output scanner 55 and logic scanner 57.

Input/output scanner 55 includes a central processing unit (CPU) 61, random access memory (RAM) 63, read only memory (ROM) 65, ethernet ports 67 and 69 and parallel I/O ports 71 and 73.

Logic scanner 57 comprises PAL control logic 81, bit sliced processor 83, program RAM 85 and data RAM 87.

DESCRIPTION OF PC 11 TASKS—FIG. 2

Editor Task 35

Editor task 35 creates and modifies ladder source code. As each rung of the ladder is created or modified, a pointer to that rung is sent to compiler task 37. When the task is initiated, an initialization step takes place which loads into memory a selected ladder diagram or a default ladder diagram. Once the initialization has been completed, an edit step commences which sets up a screen display of the ladder in memory and then executes a program loop which performs one of three types of editing as follows: (a) normal mode; (b) line mode; or (c) data monitor mode. Normal mode has two sub-modes namely element mode and command mode. In element mode, the various elements of the ladder are entered. In command mode, editing and supervisory commands are entered. In line mode, elements entered in normal mode are connected. In data monitor mode, blocks of ladder data are displayed in various formats.

Compiler Task 37

Compiler task 37 creates object code for each rung from the source code created or modified by editor task 35. Additionally, compiler task 37 may compress the source code by removing unused fields in the source. A complete description and source code listing for a suitable compiler task 37 is set forth in U.S. Pat. No. 4,722,071 which issued Jan. 26, 1988.

Communications Task 39

Communications task 39 formats object code and compressed source code generated by compiler task 39 into ethernet packets which are transmitted over ethernet cable 13 to communications task 47 in PLC 15.

DESCRIPTION OF PLC 15 TASKS AND SUBTASKS—FIG. 2

BIOS Task 45

BIOS task 45, which is a multitasking executive, is the basic input/output operating system for PLC 15.

Communications Task 47

Communications task 47 obtains ladder diagram object code and compressed source code for each rung by decoding ethernet packets sent by communications task 39. Once all necessary packets have been received and assembled, communications task 47 invokes linker sub task 51 of ladder logic control task 49.

Ladder Logic Control Task 49

Ladder logic control task 49 downloads and uploads ladder object code and source code. Linking of downloaded ladder object code and execution of the linked code are performed by linker subtask 51 and parallel logic and I/O control subtask 53.

Linker Subtask 51

Linker subtask 51 takes rungs generated compiler task 37 and adds to or replaces rungs in the ladder stored in program RAM 85.

Parallel Logic and I/O Control Subtask 53

Parallel logic and I/O control subtask 53 performs the interrelated functions of I/O scan and logic scan. In particular, during an I/O scan, a program in ROM 65 causes CPU 61 to write data from RAM 63 to peripheral controllers 17, and read data from the peripheral controllers for storage in RAM 63. During a logic scan, based upon a program in RAM 85 (the object code representing a ladder diagram), new output values to be sent to the peripheral controllers during an I/O scan are calculated based upon current input values stored in RAM 63.

DESCRIPTION OF PLC 15 COMPONENTS—FIG. 3

Input/Output Scanner 55

CPU 61 is a Motorola 68010 or equivalent. RAM 63 is 128K by 16 bit RAM available from a number of sources. ROM 65 is a 32k by 16 bit EPROM. ROM 65 stores BIOS task 45. Ethernet ports 67 and 69 are AMD part numbers 7990 or equivalent and required support circuity. Ethernet port 67 handles the receipt and transmission of ethernet packets between communications task 39 and communications task 47. Ethernet port 69 handles the receipt and transmission of ethernet packets between communications tasks in cluster controllers 25.

Parallel I/O ports 71 and 73 are standard parallel I/O ports which may be implemented in a variety of ways, the particulars of which are well know to persons skilled in the art. The details regarding a data bus, address bus and control bus, as well as timing and power considerations necessary for the proper operations of such components are well known to those skilled in the art and will be described herein only to the extent necessary for a proper understanding of the invention.

Cluster controllers 25 are similar to input/output scanner scanner 55, but do not have ethernet port 67 or logic scanner 57.

Logic Scanner 57

PAL control logic 81 is a set of eight PALs (programmable logic array) which contain the logic equations or microcode used to control the operation of bit sliced processor 83. In the preferred embodiment, the logic in the eight PALs perform the functions (i) logic scanner condition test logic; (ii) logic scanner program counter 1 (external load); (iii) logic scanner program counter 2; (iv) logic scanner program counter 3; (v) logic scanner sequencer and interface logic; (vi) logic scanner control store bus interface logic; (vii) logic scanner internal bus control logic; and (viii) logic scanner control store parity logic. The particulars of the PALs and their logic equations which perform these functions are set forth in appendix 1.

Bit sliced processor 83 is a 16 bit microprocessor available as from Advanced Micro Devices as its part number Am29116.

Program RAM 85 is a 32K by 64 bit RAM which contains executable ladder object code generated by compiler task 37 and linked by linker task 51.

Data RAM 87 is a 32K by 16 bit RAM which stores the status of each data point controlled by the system. In a fully configured system (i.e. 64 clusters of 7 racks, 16 peripheral controllers per rack for a total of 114,688 points), only 7K of storage is required. This 7K portion of RAM 87 is bit mapped to corresponding data points. The remaining 25K portion of data RAM 87 is available for use as temporary storage by the executing ladder diagram.

APPENDIX

```
CLK /RESET /CMD /WR /SCP J0  J1  CTS0 CTS1 CTS2 CTS3  GND
CT  OVR    NC1 C   Z  /LD3 /LD2 /LD1 /LD0 OET  N     VCC

/OET = GND

IF ( J0*/CTS2) LD0 = /RESET*/CMD*SCP* J1*/CTS3*         /CTS0*  Z
                   + /RESET*/CMD*SCP* J1*/CTS3*/CTS1*           N*/OVR
                   + /RESET*/CMD*SCP* J1*/CTS3*/CTS1*           /N* OVR
                   + /RESET*/CMD*SCP* J1*/CTS3* CTS1* CTS0*     OVR
                   + /RESET*/CMD*SCP* J1* CTS3*                 CT
                   + /RESET*/CMD*SCP*/J1                        C
                   + /RESET*  CMD*SCP*                          WR

IF ( J0* CTS2) LD1 = /RESET*/CMD*SCP* J1*/CTS3*         /CTS0*  Z
                   + /RESET*/CMD*SCP* J1*/CTS3*/CTS1*           C
                   + /RESET*/CMD*SCP* J1*/CTS3* CTS1*/CTS0*     /C
                   + /RESET*/CMD*SCP* J1*/CTS3* CTS1* CTS0*     N
                   + /RESET*/CMD*SCP* J1* CTS3*                 CT
                   + /RESET*/CMD*SCP*/J1
                   + /RESET*  CMD*SCP*                          WR

IF (/J0*/CTS0) LD2 = /RESET*/CMD*SCP* J1*/CTS3*/CTS2*/CTS1*  /N*/OVR*/Z
                   + /RESET*/CMD*SCP* J1*/CTS3*/CTS2*/CTS1*   N* OVR*/Z
                   + /RESET*/CMD*SCP* J1*/CTS3*/CTS2* CTS1*  /Z
                   + /RESET*/CMD*SCP* J1*/CTS3*/CTS2* CTS1*  /Z*/C
                   + /RESET*/CMD*SCP* J1*/CTS3* CTS2* CTS1*   Z*C
                   + /RESET*/CMD*SCP* J1* CTS3*              /CT
                   + /RESET*  CMD*SCP*                        WR

IF (/J0* CTS0) LD3 = /RESET*/CMD*SCP* J1*/CTS3*/CTS2*/CTS1*  /N* /OVR
                   + /RESET*/CMD*SCP* J1*/CTS3*/CTS2*/CTS1*   N* OVR
                   + /RESET*/CMD*SCP* J1*/CTS3*/CTS2* CTS1*   /OVR
                   + /RESET*/CMD*SCP* J1*/CTS3* CTS2* CTS1*   /N
                   + /RESET*/CMD*SCP* J1*/CTS3* CTS2* CTS1*   /C
                   + /RESET*/CMD*SCP* J1* CTS3*               /CT
                   + /RESET*  CMD*SCP*                        WR
```

FUNCTION TABLE

```
/RESET /CMD /WR /SCP J1 J0 CTS3 CTS2 CTS1 CTS0 Z C N OVR CT
/LD0 /LD1 /LD2 /LD3
 /
 R
 E / /    CCCC          ////
 S C / S  TTTT      O   LLLL
 E M W C JJ SSSS    V C DDDD
 T D R P 10 3210  ZCNR T 0123
-----------------------------------
 L X X X XH XLXX XXXX X   HZZZ  ; RESET
 L X X X XH XHXX XXXX X   ZHZZ
 L X X X XL XXHL XXXX X   ZZHZ
 L X X X XL XXXH XXXX X   ZZZH
 X X X H XH XLXX XXXX X   HZZZ  ; SCP
 X X X H XH XHXX XXXX X   ZHZZ
 X X X H XL XXHL XXXX X   ZZHZ
 X X X H XL XXXH XXXX X   ZZZH
 H H X L LH XLXX XXXX X   LZZZ  ; J1
 H H X L LH XHXX XXXX X   ZLZZ
 H H X L LL XXHL XXXX X   ZZHZ
 H H X L LL XXXH XXXX X   ZZZH
 H L L L XH XLXX XXXX X   LZZZ  ; RUN CMD
 H L L L XH XHXX XXXX X   ZLZZ
 H L L L XL XXHL XXXX X   ZZLZ
 H L L L XL XXXH XXXX X   ZZZL
 H H X L HH LLLL HXXX X   LZZZ  ; (N*OVR) + Z
 H H X L HH LLLL XXHL X   LZZZ
 H H X L HH LLLL XXLH X   LZZZ
 H H X L HH LLLL LXHH X   HZZZ
 H H X L HH LLLL LXLL X   HZZZ
 H H X L HL LLLL HXXX X   ZZHZ  ; /[(N*OVR) + Z]
 H H X L HL LLLL XXHL X   ZZHZ
 H H X L HL LLLL XXLH X   ZZLZ
 H H X L HL LLLL LXHH X   ZZLZ
 H H X L HL LLLL LXLL X   ZZLZ
 H H X L HH LLLH XXHL X   LZZZ  ; N*OVR
 H H X L HH LLLH XXLH X   LZZZ
 H H X L HH LLLH XXHH X   HZZZ
 H H X L HH LLLH XXLL X   HZZZ
 H H X L HL LLLH XXHL X   ZZZH  ; /(N*OVR)
 H H X L HL LLLH XXLH X   ZZZH
 H H X L HL LLLH XXHH X   ZZZL
 H H X L HL LLLH XXLL X   ZZZL
```

```
; 1980021
;/
;R
;E / /    CCCC          ////
;S C / S  TTTT      O   LLLL
;E M W C JJ SSSS    V C DDDD
;T D R P 10 3210  ZCNR T 0123
-------------------------------
 H H X L HH LLHL HXXX X  LZZZ  ; Z
 H H X L HL LLHL HXXX X  ZZHZ  ; /Z
 H H X L HH LLHL LXXX X  HZZZ
 H H X L HL LLHL LXXX X  ZZLZ
 H H X L HH LLHH XXHH X  LZZZ  ; OVR
 H H X L HH LLHH XXLL X  HZZZ
 H H X L HL LLHH XXHH X  ZZZH  ; /OVR
 H H X L HL LLHH XXLL X  ZZZL
 H H X L HH LHLL HXXX X  ZLZZ  ; Z + C
 H H X L HH LHLL XHXX X  ZLZZ
 H H X L HH LHLL LLXX X  ZHZZ
 H H X L HL LHLL HXXX X  ZZHZ  ; /(Z + C)
 H H X L HL LHLL XHXX X  ZZHZ
 H H X L HL LHLL LLXX X  ZZLZ
 H H X L HH LHLH XHXX X  ZLZZ  ; C
 H H X L HH LHLH XLXX X  ZHZZ
 H H X L HL LHLH XHXX X  ZZHZ  ; /C
 H H X L HL LHLH XLXX X  ZZLZ
 H H X L HH LHHL HXXX X  ZLZZ  ; Z + /C
 H H X L HH LHHL XLXX X  ZLZZ
 H H X L HH LHHL LHXX X  ZHZZ
 H H X L HL LHHL HXXX X  ZZHZ  ; /(Z + /C)
 H H X L HL LHHL XLXX X  ZZHZ
 H H X L HL LHHL LHXX X  ZZLZ
 H H X L HH LHHH XXXL X  ZLZZ  ; N
 H H X L HH LHHH XXXH X  ZHZZ
 H H X L HL LHHH XXXL X  ZZZH  ; /N
 H H X L HL LHHH XXXH X  ZZZL
 H H X L HH HLXX XXXX H  LZZZ  ; CT
 H H X L HH HLXX XXXX L  HZZZ
 H H X L HH HLXX XXXX L  ZLZZ
 H H X L HH HLXX XXXX L  ZHZZ
 H H X L HL HXXL XXXX H  ZZHZ  ; /CT
 H H X L HL HXXL XXXX H  ZZZH
 H H X L HL HXXL XXXX L  ZZLZ
 H H X L HL HXXL XXXX L  ZZZL
```

```
CLK /CMD /RUN D0 D1 D2 D3 HALT A1 GND
/OE /CI /CP /Q3 /Q2 /Q1 /Q0 /LD /CO VCC

Q0 := /LD*/Q0*CI                     ; COUNT UP
    + /LD*Q0*/CI                     ; HOLD
    + LD*D0                          ; LOAD

Q1 := /LD*/Q1*Q0*CI                  ; COUNT UP
    + /LD*Q1*/Q0                     ; HOLD
    + /LD*Q1*/CI                     ; HOLD
    + LD*D1                          ; LOAD

Q2 := /LD*/Q2*Q1*Q0*CI               ; COUNT UP
    + /LD*Q2*/Q1                     ; HOLD
    + /LD*Q2*/Q0                     ; HOLD
    + /LD*Q2*/CI                     ; HOLD
    + LD*D2                          ; LOAD

Q3 := /LD*/Q3*Q2*Q1*Q0*CI            ; COUNT UP
    + /LD*Q3*/Q2                     ; HOLD
    + /LD*Q3*/Q1                     ; HOLD
    + /LD*Q3*/Q0                     ; HOLD
    + /LD*Q3*/CI                     ; HOLD
    + LD*D3                          ; LOAD

CI  = CP*CMD*/A1                     ; CARRY IN (SORT OF)
    + CP*RUN*/HALT

CO  = Q3*Q2*Q1*Q0*CP*CMD*/A1         ; CARRY OUT
    + Q3*Q2*Q1*Q0*CP*RUN*/HALT
```

FUNCTION TABLE

```
CLK /OE /CMD /RUN A1 HALT /CP /LD D3 D2 D1 D0
Q3 Q2 Q1 Q0 /CI /CO
;
; / / H
; C / C R  A / /
; L O M U  A L C L DDDD    QQQQ  / /
; K E D N  1 T P D 3210    3210  I O
------------------------------------------
 C L L H L X L L LLLL      LLLL L H ; RUN COMMAND
 C L H L X L H H XXXX      LLLL H H ; HOLD
 C L H L X L L H XXXX      LLLH L H ; INCREMENT
 C L H L X L H H XXXX      LLLH H H ; HOLD
 C L H L X L L H XXXX      LLHL L H ; INCREMENT
 C L H L X L H H XXXX      LLHL H H ; HOLD
 C L H L X L L H XXXX      LLHH L H ; INCREMENT
 C L H L X L H H XXXX      LLHH H H ; HOLD
 C L H L X L L H XXXX      LHLL L H ; INCREMENT
 C L H L X L H H XXXX      LHLL H H ; HOLD
 C L H L X L L H XXXX      LHLH L H ; INCREMENT
 C L H L X L H H XXXX      LHLH H H ; HOLD
 C L H L X L L L HLHL      HLHL L H ; BRANCH ALWAYS TO 10
 C L H L X L H H XXXX      HLHL H H ; HOLD
 C L H L X L L H XXXX      HLHH L H ; INCREMENT
 C L H L X L H H XXXX      HLHH H H ; HOLD
 C L H L X L L H XXXX      HHLL L H ; INCREMENT (BRANCH FAILED)
 C L H L X L H H XXXX      HHLL H H ; HOLD
 C L H L X L L H XXXX      HHLH L H ; INCREMENT
 C L H L X L H H XXXX      HHLH H H ; HOLD
 C L H L X L L L LHLH      LHLH L H ; BRANCH CONDITIONALLY TO 5
```

```
C L H L X L H H XXXX    LHLH H H : HOLD
C L H L X L L H XXXX    LHHL L H : INCREMENT
C L H L X L L H XXXX    LHHL L H : HOLD
C L H L X L L H XXXX    LHHH L H : INCREMENT (BRANCH FAILED)
C L H L X L L H XXXX    LHHH H H : HOLD
C L H L X L L L HHLH    HHLH L H : BRANCH CONDITIONALLY TO 13
C L H L X L H H XXXX    HHLH H H : HOLD
C L H L X L L H XXXX    HHHL L H : INCREMENT
C L H L X L L H XXXX    HHHL H H : HOLD
C L H L X L L H XXXX    HHHH L L : INCREMENT
C L H L X L H H XXXX    HHHH H H : HOLD
C L H L X L L H XXXX    LLLL L H : INCREMENT
C L H L X L H H XXXX    LLLL H H : HOLD
C L H L X L L L LHHH    LHHH L H : BRANCH CONDITIONALLY TO 7
C L H L X L H H XXXX    LHHH H H : HOLD
C L H L X L H H XXXX    HLLL H H : HOLD
C L H L X L L H XXXX    HLLH L H : INCREMENT
C L H L X L H H XXXX    HLLH H H : HOLD

: 1980024
         H
: C / / Ck A / /
: L O M U A L C L DDDD    QQQQ C
: K E D N 1 T P D 3210    3210 I O
C L H L X L L H XXXX    HLHL L H : INCREMENT
C L H L X L H H XXXX    HLHL H H : HOLD
C L H L X L L H XXXX    HLHH L H : INCREMENT
C L H L X L H H XXXX    HLHH H H : HOLD
C L H L X L L H XXXX    HHLL L H : INCREMENT
C L H L X L H H XXXX    HHLL H H : HOLD
C L H L X L L H XXXX    HHLH L H : INCREMENT
C L H L X L L H XXXX    HHLH L H : HOLD
C L H L X L L H XXXX    HHHL L H : INCREMENT
C L H L X L H H XXXX    HHHL H H : HOLD
C L H L X H L H XXXX    HHHL H H : HALT INSTRUCTION
C L H L X H L H XXXX    HHHL H H : HOLD
C L L H L H L H XXXX    HHHH L L : RESUME COMMAND
C L H L X L H H XXXX    HHHH H H : HOLD
C L H L X L L H XXXX    LLLL L H : INCREMENT
C L H L X L H H XXXX    LLLL H H : HOLD
C L H L X L L H XXXX    LLLH L H : INCREMENT
C L H L X L H H XXXX    LLLH H H : HOLD
C L H L X L L H XXXX    LLHL L H : INCREMENT
C L H L X L H H XXXX    LLHL H H : HOLD
C L H L X H L H XXXX    LLHL H H : HALT INSTRUCTION
C L H L X H L H XXXX    LLHL H H : HOLD

CLK  NC  D9 D8 D7 D6 D5 D4 /LD GND
/OE /CI /Q4 /Q5 /Q6 /Q7 /Q8 /Q9 /CO VCC

Q4 := /LD*/Q4*CI                    : COUNT UP
    + /LD*Q4*/CI                    : HOLD
    + LD*D4                         : LOAD

Q5 := /LD*/Q5*Q4*CI                 : COUNT UP
    + /LD*Q5*/Q4                    : HOLD
    + /LD*Q5*/CI                    : HOLD
    + LD*D5                         : LOAD

Q6 := /LD*/Q6*Q5*Q4*CI              : COUNT UP
    + /LD*Q6*/Q5                    : HOLD
    + /LD*Q6*/Q4                    : HOLD
    + /LD*Q6*/CI                    : HOLD
    + LD*D6                         : LOAD

Q7 := /LD*/Q7*Q6*Q5*Q4*CI           : COUNT UP
    + /LD*Q7*/Q6                    : HOLD
    + /LD*Q7*/Q5                    : HOLD
    + /LD*Q7*/Q4                    : HOLD
    + /LD*Q7*/CI                    : HOLD
    + LD*D7                         : LOAD

Q8 := /LD*/Q8*Q7*Q6*Q5*Q4*CI        : COUNT UP
    + /LD*Q8*/Q7                    : HOLD
    + /LD*Q8*/Q6                    : HOLD
    + /LD*Q8*/Q5                    : HOLD
    + /LD*Q8*/Q4                    : HOLD
    + /LD*Q8*/CI                    : HOLD
    + LD*D8                         : LOAD

Q9 := /LD*/Q9*Q8*Q7*Q6*Q5*Q4*CI     : COUNT UP
    + /LD*Q9*/Q8                    : HOLD
    + /LD*Q9*/Q7                    : HOLD
    + /LD*Q9*/Q6                    : HOLD
    + /LD*Q9*/Q5                    : HOLD
    + /LD*Q9*/Q4                    : HOLD
    + /LD*Q9*/CI                    : HOLD
    + LD*D9                         : LOAD

CO  = Q9*Q8*Q7*Q6*Q5*Q4*CI          : CARRY OUT

FUNCTION TABLE

CLK /OE /LD /CI D9 D8 D7 D6 D5 D4
Q9 Q8 Q7 Q6 Q5 Q4 /CO
-----------------------------------

: C / / /                /
: L O L C DDDDDD    QQQQQQ C
: K E D I 987654    987654 O
C L L X HLHLHL    HLHLHL H : LOAD 2A
C L H H XXXXXX    HLHLHL H : HOLD
C L L X LHLHLH    LHLHLH H : LOAD 15
C L H H XXXXXX    LHLHLH H : HOLD
C L L X LLLLLL    LLLLLL H : LOAD 0
C L H H XXXXXX    LLLLLL H : HOLD
C L H L XXXXXX    LLLLLH H : INCREMENT
C L H H XXXXXX    LLLLLH H : HOLD
C L H L XXXXXX    LLLLHL H : INCREMENT
C L H H XXXXXX    LLLLHL H : HOLD
C L H L XXXXXX    LLLLHH H : INCREMENT
C L H H XXXXXX    LLLLHH H : HOLD
C L H L XXXXXX    LLLHLL H : INCREMENT
C L H H XXXXXX    LLLHLL H : HOLD
C L H L XXXXXX    LLLHLH H : INCREMENT
C L H H XXXXXX    LLLHLH H : HOLD
C L H L XXXXXX    LLLHHL H : INCREMENT
C L H H XXXXXX    LLLHHL H : HOLD
C L H L XXXXXX    LLLHHH H : INCREMENT
C L H H XXXXXX    LLLHHH H : HOLD
C L H L XXXXXX    LLHLLL H : INCREMENT
C L H H XXXXXX    LLHLLL H : HOLD
C L H L XXXXXX    LLHLLH H : INCREMENT
C L H H XXXXXX    LLHLLH H : HOLD

C L H L XXXXXX    LLHLHL H : INCREMENT
C L H H XXXXXX    LLHLHL H : HOLD
C L H L XXXXXX    LLHLHH H : INCREMENT
C L H H XXXXXX    LLHLHH H : HOLD
C L H L XXXXXX    LLHHLL H : INCREMENT
C L H H XXXXXX    LLHHLL H : HOLD
C L H L XXXXXX    LLHHLH H : INCREMENT

: 1980025
: C / / /                /
: L O L C DDDDDD    QQQQQQ C
: K E D I 987654    987654 O
C L H H XXXXXX    LLHHLH H : HOLD
C L H L XXXXXX    LLHHHL H : INCREMENT
C L H H XXXXXX    LLHHHL H : HOLD
C L H L XXXXXX    LLHHHH H : INCREMENT
C L H H XXXXXX    LLHHHH H : HOLD
C L H L XXXXXX    LHLLLL H : INCREMENT
C L H H XXXXXX    LHLLLL H : HOLD
C L H L XXXXXX    LHLLLH H : INCREMENT
C L H H XXXXXX    LHLLLH H : HOLD
C L H L XXXXXX    LHLLHL H : INCREMENT
C L H H XXXXXX    LHLLHL H : HOLD
C L H L XXXXXX    LHLLHH H : INCREMENT
C L H H XXXXXX    LHLLHH H : HOLD
C L H L XXXXXX    LHLHLL H : INCREMENT
C L H H XXXXXX    LHLHLL H : HOLD
C L H L XXXXXX    LHLHLH H : INCREMENT
C L H H XXXXXX    LHLHLH H : HOLD
C L H L XXXXXX    LHLHHL H : INCREMENT
C L H H XXXXXX    LHLHHL H : HOLD
C L H L XXXXXX    LHLHHH H : INCREMENT
C L H H XXXXXX    LHLHHH H : HOLD
C L H L XXXXXX    LHHLLL H : INCREMENT
C L H H XXXXXX    LHHLLL H : HOLD
C L H L XXXXXX    LHHLLH H : INCREMENT
C L H H XXXXXX    LHHLLH H : HOLD
C L H L XXXXXX    LHHLHL H : INCREMENT
C L H H XXXXXX    LHHLHL H : HOLD
C L H L XXXXXX    LHHLHH H : INCREMENT
C L H H XXXXXX    LHHLHH H : HOLD
C L H L XXXXXX    LHHHLL H : INCREMENT
C L H H XXXXXX    LHHHLL H : HOLD
C L H L XXXXXX    LHHHLH H : INCREMENT
C L H H XXXXXX    LHHHLH H : HOLD
C L H L XXXXXX    LHHHHL H : INCREMENT
C L H H XXXXXX    LHHHHL H : HOLD
C L H L XXXXXX    LHHHHH H : INCREMENT
C L H H XXXXXX    LHHHHH H : HOLD
C L H L XXXXXX    HLLLLL H : INCREMENT
C L H H XXXXXX    HLLLLL H : HOLD
C L H L XXXXXX    HLLLLH H : INCREMENT
C L H H XXXXXX    HLLLLH H : HOLD
C L H L XXXXXX    HLLLHL H : INCREMENT
C L H H XXXXXX    HLLLHL H : HOLD
C L H L XXXXXX    HLLLHH H : INCREMENT
C L H H XXXXXX    HLLLHH H : HOLD
C L H L XXXXXX    HLLHLL H : INCREMENT
C L H H XXXXXX    HLLHLL H : HOLD
C L H L XXXXXX    HLLHLH H : INCREMENT
C L H H XXXXXX    HLLHLH H : HOLD
C L H L XXXXXX    HLLHHL H : INCREMENT
C L H H XXXXXX    HLLHHL H : HOLD
C L H L XXXXXX    HLLHHH H : INCREMENT
C L H H XXXXXX    HLLHHH H : HOLD
C L H L XXXXXX    HLHLLL H : INCREMENT
C L H H XXXXXX    HLHLLL H : HOLD
C L H L XXXXXX    HLHLLH H : INCREMENT
C L H H XXXXXX    HLHLLH H : HOLD
C L H L XXXXXX    HLHLHL H : INCREMENT
C L H H XXXXXX    HLHLHL H : HOLD
C L H L XXXXXX    HLHLHH H : INCREMENT
C L H H XXXXXX    HLHLHH H : HOLD
C L H L XXXXXX    HLHHLL H : INCREMENT
C L H H XXXXXX    HLHHLL H : HOLD
C L H L XXXXXX    HLHHLH H : INCREMENT
C L H H XXXXXX    HLHHLH H : HOLD
C L H L XXXXXX    HLHHHL H : INCREMENT
C L H H XXXXXX    HLHHHL H : HOLD
C L H L XXXXXX    HLHHHH H : INCREMENT
C L H H XXXXXX    HLHHHH H : HOLD
C L H L XXXXXX    HHLLLL H : INCREMENT
C L H H XXXXXX    HHLLLL H : HOLD
C L H L XXXXXX    HHLLLH H : INCREMENT
C L H H XXXXXX    HHLLLH H : HOLD
C L H L XXXXXX    HHLLHL H : INCREMENT
C L H H XXXXXX    HHLLHL H : HOLD
C L H L XXXXXX    HHLLHH H : INCREMENT
C L H H XXXXXX    HHLLHH H : HOLD
C L H L XXXXXX    HHLHLL H : INCREMENT
C L H H XXXXXX    HHLHLL H : HOLD
C L H L XXXXXX    HHLHLH H : INCREMENT
C L H H XXXXXX    HHLHLH H : HOLD
C L H L XXXXXX    HHLHHL H : INCREMENT
C L H H XXXXXX    HHLHHL H : HOLD
C L H L XXXXXX    HHLHHH H : INCREMENT
C L H H XXXXXX    HHLHHH H : HOLD
C L H L XXXXXX    HHHLLL H : INCREMENT
C L H H XXXXXX    HHHLLL H : HOLD
C L H L XXXXXX    HHHLLH H : INCREMENT
C L H H XXXXXX    HHHLLH H : HOLD

: 1980025
: C / / /                /
: L O L C DDDDDD    QQQQQQ C
: K E D I 987654    987654 O
C L H L XXXXXX    HHHLHL H : INCREMENT
C L H H XXXXXX    HHHLHL H : HOLD
C L H L XXXXXX    HHHLHH H : INCREMENT
C L H H XXXXXX    HHHLHH H : HOLD
C L H L XXXXXX    HHHHLL H : INCREMENT
C L H H XXXXXX    HHHHLL H : HOLD
C L H L XXXXXX    HHHHLH H : INCREMENT
C L H H XXXXXX    HHHHLH H : HOLD
C L H L XXXXXX    HHHHHL H : INCREMENT
C L H H XXXXXX    HHHHHL H : HOLD
C L H L XXXXXX    HHHHHH L : INCREMENT
C L H H XXXXXX    HHHHHH H : HOLD
C L H L XXXXXX    LLLLLL H : INCREMENT
```

```
CLK /CTL D15 D14 D13 D12 D11 D10 /LD  GND
/OE /CI /Q10 /Q11 /Q12 /Q13 /Q14 /Q15 /PCOE VCC

Q10 := /LD*/Q10*CI                    ; COUNT UP
     + /LD*Q10*/CI                    ; HOLD
     + LD*D10                         ; LOAD

Q11 := /LD*/Q11*Q10*CI                ; COUNT UP
     + /LD*Q11*/Q10                   ; HOLD
     + /LD*Q11*/CI                    ; HOLD
     + LD*D11                         ; LOAD

Q12 := /LD*/Q12*Q11*Q10*CI            ; COUNT UP
     + /LD*Q12*/Q11                   ; HOLD
     + /LD*Q12*/Q10                   ; HOLD
     + /LD*Q12*/CI                    ; HOLD
     + LD*D12                         ; LOAD

Q13 := /LD*/Q13*Q12*Q11*Q10*CI        ; COUNT UP
     + /LD*Q13*/Q12                   ; HOLD
     + /LD*Q13*/Q11                   ; HOLD
     + /LD*Q13*/Q10                   ; HOLD
     + /LD*Q13*/CI                    ; HOLD
     + LD*D13                         ;* LOAD

Q14 := /LD*/Q14*Q13*Q12*Q11*Q10*CI    ; COUNT UP
     + /LD*Q14*/Q13                   ; HOLD
     + /LD*Q14*/Q12                   ; HOLD
     + /LD*Q14*/Q11                   ; HOLD
     + /LD*Q14*/Q10                   ; HOLD
     + /LD*Q14*/CI                    ; HOLD
     + LD*D14                         ; LOAD

Q15 := /LD*/Q15*Q14*Q13*Q12*Q11*Q10*CI ; COUNT UP
     + /LD*Q15*/Q14                   ; HOLD
     + /LD*Q15*/Q13                   ; HOLD
     + /LD*Q15*/Q12                   ; HOLD
     + /LD*Q15*/Q11                   ; HOLD
     + /LD*Q15*/Q10                   ; HOLD
     + /LD*Q15*/CI                    ; HOLD
     + LD*D15                         ; LOAD

PCOE = /CTL                           ; PROGRAM COUNTER OUTPUT ENABLE

FUNCTION TABLE

CLK /OE /CTL /LD /CI D15 D14 D13 D12 D11 D10
Q15 Q14 Q13 Q12 Q11 Q10 /PCOE
-------------------------------------------
;         /
; C / C / / DDDDDD QQQQQQ  P
; L O T L C 111111 111111  C
; K E L D I 543210 543210  O
;                          E
-------------------------------------------
  X L L X X XXXXXX XXXXXX H : PROGRAM CNTR OUTPUT DISABLE
  C L H L X HLHLHL HLHLHL L : LOAD 2A
  C L H H X LHLHLH LHLHLH L : LOAD 15
  C L H H X LLLLLL LLLLLL L : LOAD 0
  C L H H H XXXXXX LLLLLH L : INCREMENT
  C L H H H XXXXXX LLLLLH L : HOLD
  C L H H L XXXXXX LLLLHL L : INCREMENT
  C L H H H XXXXXX LLLLHL L : HOLD
  C L H H L XXXXXX LLLLHH L : INCREMENT
  C L H H H XXXXXX LLLLHH L : HOLD
  C L H H L XXXXXX LLLHLL L : INCREMENT
  C L H H H XXXXXX LLLHLL L : HOLD
  C L H H L XXXXXX LLLHLH L : INCREMENT
  C L H H H XXXXXX LLLHLH L : HOLD
  C L H H L XXXXXX LLLHHL L : INCREMENT
  C L H H H XXXXXX LLLHHL L : HOLD
  C L H H L XXXXXX LLLHHH L : INCREMENT
  C L H H H XXXXXX LLLHHH L : HOLD
  C L H H L XXXXXX LLHLLL L : INCREMENT
  C L H H H XXXXXX LLHLLL L : HOLD
  C L H H L XXXXXX LLHLLH L : INCREMENT
  C L H H H XXXXXX LLHLLH L : HOLD
  C L H H L XXXXXX LLHLHL L : INCREMENT
  C L H H H XXXXXX LLHLHL L : HOLD
  C L H H L XXXXXX LLHLHH L : INCREMENT
  C L H H H XXXXXX LLHLHH L : HOLD
  C L H H L XXXXXX LLHHLL L : INCREMENT

; 1980026                 /
; C / C / / DDDDDD QQQQQQ  P
; L O T L C 111111 111111  C
; K E L D I 543210 543210  O
;                          E
-------------------------------------------
  C L H H H XXXXXX LLHHLL L : HOLD
  C L H H L XXXXXX LLHHLH L : INCREMENT
  C L H H H XXXXXX LLHHLH L : HOLD
  C L H H L XXXXXX LLHHHL L : INCREMENT
  C L H H H XXXXXX LLHHHL L : HOLD
  C L H H L XXXXXX LLHHHH L : INCREMENT
  C L H H H XXXXXX LLHHHH L : HOLD
  C L H H L XXXXXX LHLLLL L : INCREMENT
  C L H H H XXXXXX LHLLLL L : HOLD
  C L H H L XXXXXX LHLLLH L : INCREMENT
  C L H H H XXXXXX LHLLLH L : HOLD
  C L H H L XXXXXX LHLLHL L : INCREMENT
  C L H H H XXXXXX LHLLHL L : HOLD
  C L H H L XXXXXX LHLLHH L : INCREMENT
  C L H H H XXXXXX LHLLHH L : HOLD
  C L H H L XXXXXX LHLHLL L : INCREMENT
  C L H H H XXXXXX LHLHLL L : HOLD
  C L H H L XXXXXX LHLHLH L : INCREMENT
  C L H H H XXXXXX LHLHLH L : HOLD
  C L H H L XXXXXX LHLHHL L : INCREMENT
  C L H H H XXXXXX LHLHHL L : HOLD
  C L H H L XXXXXX LHLHHH L : INCREMENT
  C L H H H XXXXXX LHLHHH L : HOLD
  C L H H L XXXXXX LHHLLL L : INCREMENT
  C L H H H XXXXXX LHHLLL L : HOLD
  C L H H L XXXXXX LHHLLH L : INCREMENT
  C L H H H XXXXXX LHHLLH L : HOLD
  C L H H L XXXXXX LHHLHL L : INCREMENT
  C L H H H XXXXXX LHHLHL L : HOLD
  C L H H L XXXXXX LHHLHH L : INCREMENT
  C L H H H XXXXXX LHHLHH L : HOLD
  C L H H L XXXXXX LHHHLL L : INCREMENT
  C L H H H XXXXXX LHHHLL L : HOLD
  C L H H L XXXXXX LHHHLH L : INCREMENT
  C L H H H XXXXXX LHHHLH L : HOLD
  C L H H L XXXXXX LHHHHL L : INCREMENT
  C L H H H XXXXXX LHHHHL L : HOLD
  C L H H L XXXXXX LHHHHH L : INCREMENT
  C L H H H XXXXXX LHHHHH L : HOLD
  C L H H L XXXXXX HLLLLL L : INCREMENT
  C L H H H XXXXXX HLLLLL L : HOLD
  C L H H L XXXXXX HLLLLH L : INCREMENT
  C L H H H XXXXXX HLLLLH L : HOLD
  C L H H L XXXXXX HLLLHL L : INCREMENT
  C L H H H XXXXXX HLLLHL L : HOLD
  C L H H L XXXXXX HLLLHH L : INCREMENT
  C L H H H XXXXXX HLLLHH L : HOLD
  C L H H L XXXXXX HLLHLL L : INCREMENT
  C L H H H XXXXXX HLLHLL L : HOLD
  C L H H L XXXXXX HLLHLH L : INCREMENT
  C L H H H XXXXXX HLLHLH L : HOLD
  C L H H L XXXXXX HLLHHL L : INCREMENT
  C L H H H XXXXXX HLLHHL L : HOLD
  C L H H L XXXXXX HLLHHH L : INCREMENT
  C L H H H XXXXXX HLLHHH L : HOLD
  C L H H L XXXXXX HLHLLL L : INCREMENT
  C L H H H XXXXXX HLHLLL L : HOLD
  C L H H L XXXXXX HLHLLH L : INCREMENT
  C L H H H XXXXXX HLHLLH L : HOLD
  C L H H L XXXXXX HLHLHL L : INCREMENT
  C L H H H XXXXXX HLHLHL L : HOLD
  C L H H L XXXXXX HLHLHH L : INCREMENT
  C L H H H XXXXXX HLHLHH L : HOLD
  C L H H L XXXXXX HLHHLL L : INCREMENT
  C L H H H XXXXXX HLHHLL L : HOLD
  C L H H L XXXXXX HLHHLH L : INCREMENT
  C L H H H XXXXXX HLHHLH L : HOLD
  C L H H L XXXXXX HLHHHL L : INCREMENT
  C L H H H XXXXXX HLHHHL L : HOLD
  C L H H L XXXXXX HLHHHH L : INCREMENT
  C L H H H XXXXXX HLHHHH L : HOLD
  C L H H L XXXXXX HHLLLL L : INCREMENT
  C L H H H XXXXXX HHLLLL L : HOLD
  C L H H L XXXXXX HHLLLH L : INCREMENT
  C L H H H XXXXXX HHLLLH L : HOLD
  C L H H L XXXXXX HHLLHL L : INCREMENT
  C L H H H XXXXXX HHLLHL L : HOLD
  C L H H L XXXXXX HHLLHH L : INCREMENT
  C L H H H XXXXXX HHLLHH L : HOLD
  C L H H L XXXXXX HHLHLL L : INCREMENT
  C L H H H XXXXXX HHLHLL L : HOLD
  C L H H L XXXXXX HHLHLH L : INCREMENT
  C L H H H XXXXXX HHLHLH L : HOLD
  C L H H L XXXXXX HHLHHL L : INCREMENT
  C L H H H XXXXXX HHLHHL L : HOLD
  C L H H L XXXXXX HHLHHH L : INCREMENT
  C L H H H XXXXXX HHLHHH L : HOLD
  C L H H L XXXXXX HHHLLL L : INCREMENT
  C L H H H XXXXXX HHHLLL L : HOLD

; 1980026                 /
; C / C / / DDDDDD QQQQQQ  P
; L O T L C 111111 111111  C
; K E L D I 543210 543210  O
;                          E
-------------------------------------------
  C L H H L XXXXXX HHHLLH L : INCREMENT
  C L H H H XXXXXX HHHLLH L : HOLD
  C L H H L XXXXXX HHHLHL L : INCREMENT
  C L H H H XXXXXX HHHLHL L : HOLD
  C L H H L XXXXXX HHHLHH L : INCREMENT
  C L H H H XXXXXX HHHLHH L : HOLD
  C L H H L XXXXXX HHHHLL L : INCREMENT
  C L H H H XXXXXX HHHHLL L : HOLD
  C L H H L XXXXXX HHHHLH L : INCREMENT
  C L H H H XXXXXX HHHHLH L : HOLD
  C L H H L XXXXXX HHHHHL L : INCREMENT
  C L H H H XXXXXX HHHHHL L : HOLD
  C L H H L XXXXXX LLLLLL L : INCREMENT

CLK  /RESET /CTRLSTR /OPSTR /CMD /WR A1 A2 NDX HALT WE  GND
/SYNCAS /ACP /S0 /S1 /B1 /B0 /OPW /SCP /INT /RUN /PAROK VCC

; STATE      INPUT
                                       ; -----      -----
RUN := /RESET*/SCP*    RUN             ; TRAP OR RUN  NO CLOCK
     + /RESET* SCP*                    ; ANY          RUN CMD
     + /RESET* SCP*         CMD*/A2*/A1; ANY          RUN CMD
     + /RESET* SCP* INT*RUN*    CMD    ; RUNNING      NO CMD AND NO HALT INST
     + /RESET* SCP*/INT*RUN* CMD*/HALT ; RUNNING      NO CMD
     + /RESET* SCP*/INT*RUN* CMD*/A1   ; TRAP         CMD, BUT NOT A RST INT
     + /RESET* SCP*/INT*RUN* CMD*/A2   ; RUNNING      CMD, BUT NOT A HALT CMD

INT := /RESET*/SCP* INT                ; INT OR TRAP  NO CLOCK
     + /RESET* SCP*/INT*RUN* CTRLSTR   ; RUNNING      CONTROL STORE ACCESS
     + /RESET* SCP*/INT*RUN* OPSTR     ; RUNNING      OPERAND STORE ACCESS
     + /RESET* SCP*/INT*RUN* CMD*/A2   ; RUNNING      CMD, BUT NOT A HALT CMD
     + /RESET* SCP*/INT*RUN* CMD* HALT ; RUNNING      HALT INSTRUCTION
     + /RESET* SCP*/INT*RUN* CMD*/PAROK; RUNNING      PARITY ERROR
     + /RESET* SCP* INT*        /CMD   ; INT OR TRAP  NO CMD
     + /RESET* SCP* INT*         CMD* A2; INT OR TRAP HALT CMD

S0 := /RESET*/INT*RUN*/CTRLSTR*/OPSTR*/CMD*/S1              ; -- STATE COUNTER --
S1 := /RESET*/INT*RUN*/CTRLSTR*/OPSTR*/CMD*/NDX*S0*/S1
    + /RESET*/INT*RUN*/CTRLSTR*/OPSTR*/CMD*NDX*S0

ACP := /RESET*/INT*RUN*/CTRLSTR*/OPSTR*/CMD*/NDX*/S1*S0     ;-- ALU CLOCK --
     + /RESET*/INT*RUN*/CTRLSTR*/OPSTR*/CMD* NDX* S1*S0

SCP := /RESET*/INT*RUN*/CTRLSTR*/OPSTR*/CMD*/NDX*/S1*S0     ;-- SYSTEM CLOCK --
     + /RESET*/INT*RUN*/CTRLSTR*/OPSTR*/CMD* NDX* S1*S0
     + /RESET*SYNCAS*/B1*/B0*CTRLSTR                         ; CONTROL STORE
     + /RESET*SYNCAS*/B1*/B0*OPSTR                           ; OPERAND STORE
     + /RESET*SYNCAS*/B1*/B0*CMD                             ; COMMAND

B0 := /RESET*SYNCAS*/B1                                      ;-- BUS CYC CNTR --
B1 := /RESET*SYNCAS* B0
    + /RESET*SYNCAS* B1

OPW := /RESET*/INT*RUN*/CTRLSTR*/OPSTR*/CMD*/NDX*/S1*S0*WE  ;-- OP WR ENB --
     + /RESET*/INT*RUN*/CTRLSTR*/OPSTR*/CMD* NDX* S1*S0*WE
     + /RESET*OPSTR*WR*SYNCAS*/B1*/B0                        ; OP STORE ACCESS

IF (GND) PAROK = GND  ; NEED THIS TO MAKE PIN 23 AN INPUT

FUNCTION TABLE

CLK /RESET /CTRLSTR /OPSTR /CMD /SYNCAS /WR A2 A1 HALT WE NDX /PAROK
/INT /RUN S1 S0 B1 B0 /SCP /ACP /OPW
-------------------------------------------
```

```
;       /
;      C /
;    / T/  S       /
;    R RO Y        P
;    E LP/N   H A     //      ///
;    CS SSC C/   A NR    IR    SAO
;    LE TTM AW AA LWOO NU SS BB CCP
;    KT RRD SR 21 TEXX TN 10 10 PPW   ACTION              NEW STATE

CL XXX XX XX XXXX  HH LL LL HHH  ; RESET              IDLE
    CH HHH HX XX XXXX  HH LL LL HHH
    CH LHH LX XX XXXX  HH LL LH LHH  ; CTRL STORE ACCESS  IDLE
    CH LHH HX XX XXXX  HH LL HH HHH
    CH HHH HX XX XXXX  HH LL LL HHH
    CH HLH LH XX XXXX  HH LL LH LHH  ; OP STORE READ      IDLE
    CH HLH LH XX XXXX  HH LL LL HHH
    CH HHH HX XX XXXX  HH LL LL HHH
    CH HLH LL XX XXXX  HH LL LH LHL  ; OP STORE WRITE     IDLE
    CH HLH LL XX XXXX  HH LL HH HHH
    CH HHH HX XX XXXX  HH LL LL HHH
    CH HHL LH LH XXXX  HH LL LH LHH  ; RST INT CMD        IDLE
    CH HHL LH LH XXXX  HH LL HH HHH
    CH HHH HX XX XXXX  HH LL LL HHH
    CH HHL LH HL XXXX  HH LL LH LHH  ; HALT CMD           IDLE
    CH HHL LH HL XXXX  HH LL HH HHH
    CH HHH HX XX XXXX  HH LL LL HHH
    CH HHL LL LL XXLX  HH LL LH HHH  ; RUN CMD            RUN
    CH HHL LL LL XXLX  HL LL HH HHH  ; FIRST INST
    CH HHH HX XX XXLX  HL LL LL HHH  ; NO WR ENB
    CH HHH HX XX XLLX  HL HH LL LLH  ; NOT HALT. PAR OK

; 1980027
;       /
;      C /
;    / T/  S       /
;    R RO Y        P
;    E LP/N   H A     //      ///
;    CS SSC C/   A NR    IR    SAO
;    LE TTM AW AA LWOO NU SS BB CCP
;    KT RRD SR 21 TEXX TN 10 10 PPW   ACTION              NEW STATE

CH HHH HX XX LXLL  HL LL LL HHH  ; START NEXT INST
                                     ;   WR ENB
    CH HHH HX XX XHLX  HL HH LL LLL  ;   NOT HALT. PAR OK
    CH HHH HX XX LXLL  HL LL LL HHH  ; START NEXT INST
    CH HHH HX XX XXLX  HL LH LL HHH  ;   NO WR ENB
    CH HHH HX XX XLLX  HL HH LL LLH  ; HALT. PAR OK       INT
    CH HHH HX XX HXLL  LH LL LL HHH
    CH LHH LX XX XXLX  LH LL LH LHH  ; CTRL STORE ACCESS  INT
    CH LHH LX XX XXLX  LH LL HH HHH
    CH HHH HX XX XXLX  LH LL LL HHH
    CH HLH LL XX XXLX  LH LL LH LHL  ; OP STORE ACCESS    INT
    CH HLH LL XX XXLX  LH LL HH HHH
    CH HHL LX HL XXLX  LH LL LH LHH  ; HALT COMMAND       INT
    CH HHL LX HL XXLX  LH LL HH HHH
    CH HHH HX XX XXLX  LH LL LL HHH
    CH HHL LX LH XXLX  LH LL LH LHH  ; RST INT COMMAND    IDLE
    CH HHL LX LH XXLX  HH LL HH HHH
    CH HHH HX XX XXLX  HH LL LL HHH
    CH HHL LX LL XXLX  HL LL HH HHH  ; RUN COMMAND        RUN
    CH HHL LX LL XXLX  HL LL HH HHH
    CH HHH HX XX XXLX  HL LH LL HHH
    CH LHH LX XX LXLX  LL LL LH LHH  ; CTRL STORE ACCESS  TRAP
    CH LHH LX XX LXLX  LL LL HH HHH
    CH HHH HX XX XXLX  HL LH LL HHH
    CH HHL LX LL XXLX  LL LL LH LHH  ; RUN COMMAND        RUN
    CH HHL LX LL XXLX  HL LL HH HHH
    CH HHH HX XX XXLX  HL LH LL HHH
    CH HLH LH XX LXLX  LL LL HH HHH  ; OP STORE ACCESS    TRAP
    CH HHH HX XX XXLX  HL LH LL HHH
    CH HHL LX LL XXLX  LL LL LH LHH  ; RUN COMMAND        RUN
    CH HHL LX LL XXLX  HL LL HH HHH
    CH HHH HX XX XXLX  HL LH LL HHH
    CH HHL LX LL XXLX  LL LL HH HHH  ; RUN COMMAND        RUN
    CH HHL LX LL XXLX  HL LL HH HHH
    CH HHH HX XX XXLX  HL LH LL HHH
    CH HHL LX LH XXLX  LL LL LH LHH  ; RST INT COMMAND    TRAP
    CH HHL LX LH XXLX  LL LL LL HHH
    CH HHH HX XX XXLX  HL LH LL HHH
    CH HHL LX LL XXLX  HL LL HH HHH  ; RUN COMMAND        RUN
    CH HHH HX XX XXLX  HL LH LL HHH
    CH HHL LX HL XXLX  HL LL LH LHH  ; HALT COMMAND       IDLE
    CH HHL LX HL XXLX  HH LL LL HHH
    CH HHH HX XX XXLX  HH LL LL HHH
    CH HHL LX LL XXLX  HH LL HH HHH  ; RUN COMMAND        RUN
    CH HHL LX LL XXLX  HL LL HH HHH
    CH HHH HX XX XXLX  LH LH LL HHH
    CH HHH HX XX XLLX  LL LL LL HHH  ; PARITY ERROR       TRAP
    CH HHH HX XX XLLX  LL LL LL HHH
    CH LHH LX XX XXLX  LL LL LH LHH  ; CTRL STORE ACCESS  TRAP
    CH LHH LX XX XXLX  LL LL LL HHH
    CH HHH HX XX XXLX  LL LL LL HHH
    CH HLH LH XX XXLX  LL LL LH LHH  ; OP STORE ACCESS    TRAP
    CH HLH LH XX XXLX  LL LL HH HHH
    CH HHL LX HL XXLX  LL LL LH LHH  ; HALT COMMAND       TRAP
    CH HHL LX HL XXLX  LL LL HH HHH
    CH HHH HX XX XXLX  LL LL LL HHH
    CH HHL LX LH XXLX  HH LL HH HHH  ; RST INT COMMAND    IDLE
    CH HHH HX XX XXLX  HH LL LL HHH
    CH HHL LX LL XXLX  HH LL LH LHH  ; RUN COMMAND        RUN
    CH HHL LX LL XXLX  HL LL HH HHH
    CH HHH HX XX XXLX  HL LH LL HHH
    CH HHH HX XX XXLX  HL HH LL LLH
    CH HHH HX XX HXLL  LH LL LL HHH  ; HALT INSTRUCTION   INT
    CH HHL LX LL XXLX  HL LL HH HHH  ; RUN COMMAND        RUN
    CH HHH HX XX XXLX  HL LH LL HHH
    CH HHL LX HL XXLX  HL LL LH LHH  ; HALT COMMAND       IDLE
    CH HHL LX HL XXLX  HH LL LL HHH
```

/RESET /CTRLSTR /OPSTR /CMD /INTACK  A2   A1   /B0  /B1  GND
/WR /CSDEN2 /CSRWE2 /CSDEN1 /CSRWE1 /CSDEN0 /CSRWE0 /CSDEN3 /CSRWE3 VCC

CSDEN0 = /RESET*CTRLSTR*/A2*/A1         ; DATA TRANCEIVER ENABLES
CSDEN1 = /RESET*CTRLSTR*/A2* A1
CSDEN2 = /RESET*CTRLSTR* A2*/A1
CSDEN3 = /RESET*CTRLSTR* A2* A1
       + /RESET*OPSTR
       + /RESET*CMD
       + /RESET*INTACK

CSRWE0 = /RESET*CTRLSTR*WR*/B1*B0*/A2*/A1  ; WRITE ENABLES
CSRWE1 = /RESET*CTRLSTR*WR*/B1*B0*/A2* A1
CSRWE2 = /RESET*CTRLSTR*WR* B1*B0* A2*/A1
CSRWE3 = /RESET*CTRLSTR*WR* B1*B0* A2* A1

FUNCTION TABLE

/RESET /CTRLSTR /OPSTR /CMD /INTACK /WR A2 A1 B1 B0
/CSDEN0 /CSDEN1 /CSDEN2 /CSDEN3 /CSRWE0 /CSRWE1 /CSRWE2 /CSRWE3
----------------------------------------------------------
;       /
;      C /
;    / T/   I              ////////
;    R RO  N               CCCCCCCC
;    E LP/ T               SSSSSSSS
;    SSSCA/                DDDDRRRR
;    ETTMCW AA BB          EEEEWWWW
;    TRRDKR 21 10          NNNNEEEE
;                          01230123
    L XXXXX XX XX         HHHHHHHH  : RESET
    X HXXXX XX XX         HHHXHHHH  : CTRLSTR
    X XXXXX HX XX         XXXXHHHH  : CTRLSTR.OPSTR.CMD.INTACK
    X XXXXH XX XX         XXXXHHHH  : WR
    X XXXXX XH XX         XXXXHHHH  : B0
    X XXXXX XX HX         XXXXHHHH  : B1
    H LHHHL LL LH         LHHHLHHH  : CSDEN0. CSRWE0
    H LHHHL LH LH         HHLHHLHH  : CSDEN1. CSRWE1
    H LHHHL HL LH         HHLHHLHH  : CSDEN2. CSRWE2
    H LHHHL HH LH         HHHLHHHL  : CSDEN3. CSRWE3
    H HHLHX XX XX         HHHLHHHH  : CSDEN3. OPSTR
    H HHHLX XX XX         HHHLHHHH  : CSDEN3. CMD
    H HHHHL XX XX         HHHLHHHH  : CSDEN3. INTACK

/RUN /CTRLSTR /OPSTR /INTACK /WR /S0 /S1 SRC0 SRC1 GND
NDX /OPAIN /OPROE OPBOE IND /OPBDR /OPBIN /NDXOE VCC

:            RUN TIME LOGIC                  IDLE LOGIC
:            --------------                  ---------
OPAOE = /CTRLSTR*/OPSTR*/INTACK*/S1*/S0       + CTRLSTR
      + /CTRLSTR*/OPSTR*/INTACK*      /NDX

OPAIN = /CTRLSTR*/OPSTR*/INTACK*/S1* S0*/NDX* SRC1*/SRC0

OPBOE = /CTRLSTR*/OPSTR*/INTACK*/S1* S0*/NDX     + CTRLSTR
      + /CTRLSTR*/OPSTR*/INTACK*       S0* NDX   + INTACK*/RUN
      + /CTRLSTR*/OPSTR*/INTACK* S1  */NDX*/IND
      + /CTRLSTR*/OPSTR*/INTACK* S1*/S0* NDX*/IND

OPBIN = /CTRLSTR*/OPSTR*/INTACK*/S1* S0*/NDX* SRC1*/SRC0   + OPSTR
      + /CTRLSTR*/OPSTR*/INTACK*       S0* NDX* SRC1* SRC0
      + /CTRLSTR*/OPSTR*/INTACK* S1      */NDX* IND
      + /CTRLSTR*/OPSTR*/INTACK* S1*/S0* NDX* IND

OPBDR = /CTRLSTR*/OPSTR*/INTACK*/S1* S0*/NDX* SRC1* SRC0   + OPSTR* WR
      + /CTRLSTR*/OPSTR*/INTACK*        S0* NDX* SRC1* SRC0

OPROE = /CTRLSTR*/OPSTR*/INTACK*/S1* S0*/NDX* SRC1* SRC0   + OPSTR*/WR
      + /CTRLSTR*/OPSTR*/INTACK*        S0* NDX* SRC1* SRC0

NDXOE = /CTRLSTR*/OPSTR*/INTACK*          S0* NDX
      + /CTRLSTR*/OPSTR*/INTACK* S1*           NDX

FUNCTION TABLE

/RUN /CTRLSTR /OPSTR /INTACK /WR S1 S0 SRC1 SRC0 NDX IND
/OPAOE /OPAIN /OPBOE /OPBIN /OPBDR /OPROE /NDXOE
;       /
;      C /
;    / T/  I             ///////
;    R RO  N             OOOOOON
;    / LPT    SS         PPPPPPD
;    R SSA/   RR N I     AABBBRX
;    U TTCW   SS CC D N  OIOIDOO
;    N RRRK   10 10 X D  EENENEE
    X HHH X L L X X X X  L X X X X X X  : OPAOE (OPERAND A OUTPUT ENABLE)
    X L X X X X X X X X  L X X X X X X
    X H H H X LH HL X X  X L X X X X X  : OPAIN (OPERAND A INTERCONNECT)
    X H H H X LH HL X X  X X L X X X X  : OPBOE (OPERAND B OUTPUT ENABLE)
    X H H H X HX XX L L  X X L X X X X
    X L X X X X X X X X  X X L X X X X
    H X X X X X X X X X  X X L X X X X
    X H H H X LH HH L L  X X X L X X X  : OPBIN (OPERAND B INTERCONNECT)
    X H H H X HX XX L H  X X X L X X X
    X H H H X HH HH X X  X X X L X X X
    X X L X X X X X X X  X X X X L X X
    X H H H X LH HH L L  X X X X L X X  : OPBDR (OPERAND B DIRECTION)
    X X L X X X X X X X  X X X X X L X
    X H H H X LH LH X X  X X X X X L X  : OPROE (OPERAND B OUTPUT ENABLE)
    X H H H X HH LH X X  X X X X X L X
    X H H H X HH HH X X  X X X X X X L  : NDXOE (INDEX REGISTER OUTPUT ENABLE)

I claim:

1. In a programmable logic controller system including a programmable logic controller having input/output scanner means for reading data from and writing data to a plurality of peripheral controller as determined by a ladder diagram, each of said plurality of peripheral controllers for controlling a plurality of data points, said input/output scanner means including an input/output scan processor coupled to input/output ports, said input/output ports for coupling to said plurality of peripheral controllers, and a first data memory means for storing data read from and to be written to said peripheral controllers, the improvement comprising a logic scanner means coupled to said input/output scanner means for executing compiled Boolean logic statements representing said ladder diagram, wherein said logic scanner means comprises program memory means for storing said compiled Boolean logic statements, control logic means coupled to said input/output scan processor for storing logic equations, a Boolean processor coupled to said program memory means for directly executing said compiled Boolean logic statements under control of said logic equations, and second data memory means coupled to said Boolean processor for storing the status of each of said plurality of data points as determined by operation of said Boolean processor based upon said data sent from said peripheral controllers and stored in said first memory means.

2. The improvement defined by claim 1 wherein said program memory means comprises a random access memory.

3. The improvement defined by claim 1 wherein said control logic means comprises a programmed logic array programmed with said logic equations.

4. The improvement defined by claim 1 wherein said Boolean processor comprises a bit sliced microprocessor.

5. The improvement defined by claim 1 wherein said data memory means comprises a random access memory.

* * * * *

UNITED STATES PATENT AND TRADEMARK OFFICE
CERTIFICATE OF CORRECTION

PATENT NO. : 4,969,083
DATED : 11/06/90
INVENTOR(S) : Gates

It is certified that error appears in the above-identified patent and that said Letters Patent is hereby corrected as shown below:

On the title page, item:

| | | |
|---|---|---|
| [73] Assignee | delete "Petron Controls Corporation", | |
| | insert --Pertron Controls Corporation-- | |
| col. 02, line 08 | after "output" | insert --.-- |
| col. 13, line 33 | delete "controller" | insert --controllers-- |

Signed and Sealed this

First Day of February, 1994

Attest:

BRUCE LEHMAN

*Attesting Officer*  Commissioner of Patents and Trademarks